United States Patent
Richton et al.

(10) Patent No.: US 6,538,600 B1
(45) Date of Patent: *Mar. 25, 2003

(54) WIRELESS ASSISTED GPS USING A REFERENCE LOCATION

(75) Inventors: Robert Ellis Richton, Madison, NJ (US); Giovanni Vannucci, Township of Middletown, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/321,075

(22) Filed: May 27, 1999

Related U.S. Application Data (60) Provisional application No. 60/104,661, filed on Oct. 16, 1998.

(51) Int. Cl.[7] ............................................... H04B 7/185
(52) U.S. Cl. .............................. 342/357.1; 342/357.05
(58) Field of Search .......................... 342/357.05, 357.06, 342/357.09, 357.1, 357.15; 701/213, 215

(56) References Cited

U.S. PATENT DOCUMENTS

| | | | |
|---|---|---|---|
| 4,445,118 A | | 4/1984 | Taylor et al. |
| 5,365,450 A | | 11/1994 | Schuchma et al. ............ 364/449 |
| 5,596,330 A | * | 1/1997 | Yokev et al. ................. 342/387 |
| 5,862,172 A | * | 1/1999 | Sugita et al. ................. 375/200 |
| 6,114,991 A | * | 9/2000 | Richton et al. ............. 342/357.1 |

FOREIGN PATENT DOCUMENTS

| | | | |
|---|---|---|---|
| EP | WO97/14049 | 4/1997 | ............. G01S/1/04 |
| EP | 0902300 A | 3/1999 | ............. G01S/5/14 |
| EP | 0902554 A | 3/1999 | ............ H04B/7/185 |

\* cited by examiner

Primary Examiner—Dao Phan
(74) Attorney, Agent, or Firm—Harness, Dickey & Pierce, P.L.C.; Jimmy Goo (57) ABSTRACT

The invention is directed towards a method for estimating a PRN synchronization and Doppler shift of a satellite signal at a reference location within a cell and sector of where a wireless terminal or WAG client is located. The estimates are based on information conveyed by a GPS signal acquired by an auxiliary system or WAG server, which may be at a location different from the wireless terminal or WAG client. The PRN synchronization and Doppler shift estimates are also based on some reference time, which is a time that is sufficiently far into the future to allow the WAG client to demodulate and decode the PRN synchronization and Doppler shift estimates from an assisting message transmitted by the WAG server and to use such estimates to acquire GPS signals, wherein the assisting message indicates the PRN synchronization and Doppler shift estimates.

13 Claims, 8 Drawing Sheets

| Parameter name | Number of bits | Totals |
|---|---|---|
| Type of assisting message | 2 | Total: 92 |
| Assisting message reference number | 10 | |
| Reference location − latitude and longitude | 20 + 20 | |
| Reference location − elevation | 10 | |
| Reference time | 16 | |
| Number of SVs | 4 | |
| Number of Nav data records | 4 | |
| Nav data record size | 6 | |
| The next 9 records will be repeated [Number of SVs] times | | |
| SV identifier | 6 | Total: 115 x (Number of SVs) |
| SV elevation and azimuth | 18 + 18 | |
| Time derivatives of SV elevation and azimuth | 4 + 4 | |
| SV Doppler shift | 18 | |
| Time of arrival − fractional chip phase | 12 | |
| Time of arrival − code generator state | 10 | |
| Time of arrival − 1-ms epoch | 5 | |
| Time of arrival − 20-ms epoch | 4 | |
| High and Low ends of TOA range (chips) | 6 + 6 | |
| Pointer to Nav data record | 4 | |
| The next record will be repeated [Number of Nav data records] times | | |
| SV navigation data message bits | 30 x [ Nav data record size] | |

FIG. 6

GRRM parameter sizes and functions (network-aided computation)

| Parameter name | Number of bits | Totals |
|---|---|---|
| Type of response message | 2 | Total: 20 |
| Number of pseudo-range reports | 10 | |
| Number of status reports | 8 | |
| The next 6 records will be repeated [Number of pseudo − range reports] times | | |
| Assisting message reference number | 10 | Total: 89 x (Number of pseudo-range reports) |
| SV identifier | 6 | |
| Integration interval size | 4 | |
| Integration interval offset | 6 | |
| Observed Doppler | 14 | |
| Observed fractional phase | 12 | |
| Observed whole chips | 7 | |
| Signal strength | 10 | |
| Reserved for future extensions | 20 | |
| The next 3 records will be repeated [Number of status reports] times | | |
| Assisting message reference number | 10 | |
| Size of status report | 8 | |
| Status report | 8 x [Size of status report] | |

FIG. 7

GRRM parameter sizes and functions (handset-autonomous computation)

| Parameter name | Number of | Totals |
|---|---|---|
| Type of response message | 2 | Total: 10 |
| Number of status reports | 8 | |
| The next record will be repeated [Number of status reports] times | | |
| Assisting message reference number | 10 | Total: 98 x (Number of status reports) |
| Delta Time | 18 | |
| Delta Latitude | 18 | |
| Delta Longitude | 18 | |
| Delta Elevation | 18 | |
| Quality indicator | 8 | |
| Size of Status Report | 8 | |
| Status report | 8 x [Size of status report] | |

WIRELESS ASSISTED GPS USING A REFERENCE LOCATION

CROSS REFERENCE

This application claims the benefit of earlier filed United States Provisional Application serial No. 60/104,661 filed on Oct. 16, 1998.

FIELD OF THE INVENTION

The present invention relates generally to satellite positioning systems and, in particular, to a telecommunications-based auxiliary system that assists a wireless terminal in determining its position from signals transmitted from one or more navigation satellites.

BACKGROUND OF THE INVENTION

Figure 1:
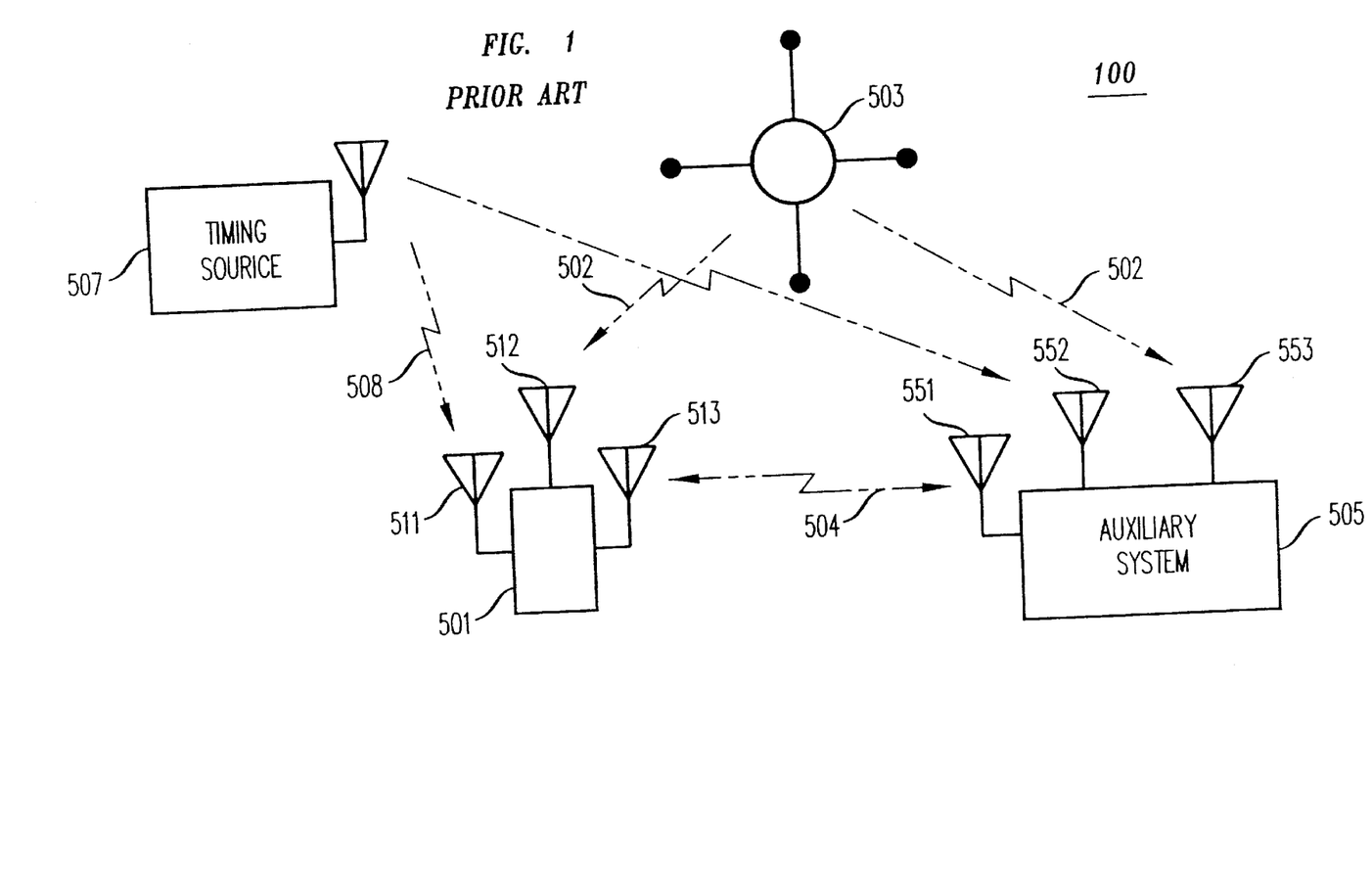
FIG. 1 depicts a block diagram of a satellite positioning system.

FIG. 1 depicts a prior art satellite positioning system 100, also referred to herein as a Wireless Assisted Global Positioning System (WAG). The satellite positioning system depicted comprises wireless terminal or WAG client 501, satellite constellation 503, auxiliary system or WAG server 505, and timing source 507. Satellite constellation 503 is the Global Positioning System (GPS) comprising a plurality of satellites for transmitting GPS signals that convey a variety of location related information including ranging information and satellite ephemeris information. GPS is well-known in the art. It will be clear to those skilled in the art how to make and use embodiments of the present invention that work with other satellite constellations. WAG server 505 and WAG client 501 are operable to acquire GPS signals and process GPS signals (i.e., demodulate and extract) in order to obtain the information being conveyed by the GPS signals.

The principal goal of WAG is to reduce the signal acquisition and signal processing requirements of a conventional wireless terminal so that a wireless terminal in accordance with the illustrative embodiment can determine its location more quickly and with weaker signals than wireless terminals in the prior art. In accordance with WAG, the signal acquisition and signal processing requirements of wireless terminal 501 are reduced at the expense of auxiliary system 505. In particular, the tasks of signal acquisition and signal processing required for a conventional wireless terminal to determine its position are divided between wireless terminal 501 and auxiliary system 505.

It will be clear to those skilled in the art how the signal processing task can be divided between wireless, terminal 501 and auxiliary system 505, as partially processed signal information can be exchanged back and forth between the two through wireless telecommunications link 504 as needed to achieve desirable division of the signal processing task.

It is possible to divide the signal processing task between wireless terminal 501 and auxiliary system 505 because each signal transmitted by each satellite in satellite constellation 503 conveys ranging and satellite ephemeris information that are responsive to independent acquisition and independent processing. Specifically, a GPS signal transmitted from a particular satellite will convey the same satellite ephemeris information to a receiver (e.g., WAG client or WAG server) regardless of which receiver acquires and processes the signal. Basically, the GPS signal is modulated with digital information in a manner similar to how, for example, a cellular telephone's radio signal is modulated with voice data. Such information can be detected and demodulated by any receiver adapted to do so. The information reconstructed by the receiver is an exact replica of the information modulated onto the signal by the transmitter (except for unwanted errors due to noise, distortion, etc.) and is the same for all receivers, regardless of their position.

By contrast, a GPS signal transmitted from a particular satellite will convey different ranging information to different receivers acquiring and processing the GPS signal. The transmitter (i.e., satellite) carefully adjusts the timing of the transmitted signal according to some precise reference, such that the timing of the signal, as received by the receiver, carries information about the distance between the transmitter and the receiver (and, therefore, about the receiver's position). Such information will be different from receiver to receiver, and is only available at the receiver itself.

For example, since each satellite in constellation 503 transmits a signal 502 that contains both kinds of information to both wireless terminal 501 and auxiliary system 505, some or all of the information about the satellites' ephemeris is acquired by auxiliary system 505 through antenna 553, even though the ranging information acquired by auxiliary system 505 is relevant to the position of auxiliary system antenna 553 and not to the position of wireless terminal 501. However, auxiliary system 505 has approximate knowledge of the position of wireless terminal 501 (for example, through knowledge of the cell and sector where the wireless terminal is located); therefore, auxiliary system 505 combines this knowledge with the acquired ranging and satellite ephemeris information to compute an estimate of the ranging information at the position of wireless terminal 501. This estimate, together with the satellites' ephemeris information, is transmitted, via wireless telecommunications antenna 551, to wireless terminal 501 to assist wireless terminal 501 in acquiring and processing ranging information.

Once the ranging information has been acquired by wireless terminal 501, wireless terminal 501 can use the satellite ephemeris information and ranging information to determine its location, or wireless terminal 501 can transmit the ranging information back to auxiliary system 505 so that auxiliary system 505 can determine the location of wireless terminal 501.

Because wireless terminal 501 is freed from the task of acquiring some or all of the information about the satellites' ephemeris and is advantageously provided with an estimate of the ranging information, it can be fabricated from less expensive technology that need only perform the easier task of acquiring and processing the ranging information with a priori knowledge of an estimated form of that information. Furthermore, because the satellite ephemeris information is modulated onto the same carrier as the ranging information, the provision of the satellites' ephemeris information to wireless terminal 501 enables wireless terminal 501 to remove the satellites' ephemeris information from the satellite signal received through antenna 512 and, thereby, acquire the ranging information even under faded conditions of low signal-tonoise noise ratio that are inadequate for the operation of a wireless terminal in prior art.

Figure 2:
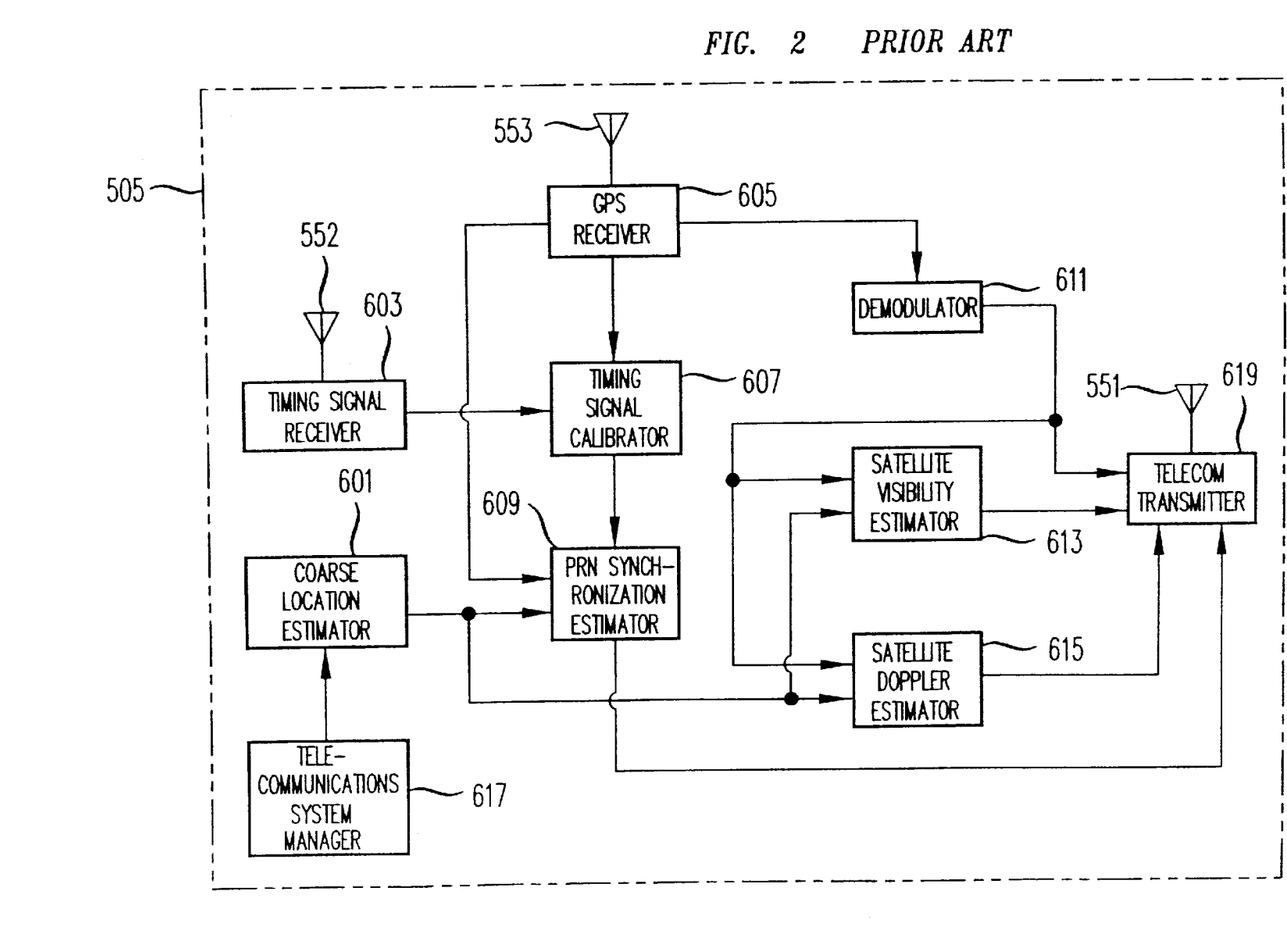
FIG. 2 depicts a block diagram of the auxiliary system shown in FIG. 1.

FIG. 2 depicts a block diagram of the salient components of auxiliary system 505, which comprises: timing signal receiver 603, timing signal antenna 552, coarse location estimator 601, telecommunications system manager 617, GPS receiver 605, GPS receiver antenna 553, timing signal calibrator 607, PRN synchronization estimator 609, demodulator 611, satellite visibility estimator 613, satellite Doppler estimator 615, telecommunications transmitter 619 and telecommunications antenna 551.

In general, auxiliary system 505 uses its GPS receiver to obtain from each satellite above the horizon both ranging information and information about the satellite's ephemeris, in well-known fashion using a Coarse Acquisition (C/A) code. It will be clear to those skilled in the art how to make and use embodiments of the present invention that use a P(Y) or P code. In the process of obtaining the ranging and satellite ephemeris information, auxiliary system 505 learns, among other things: (1) the PRN synchronization from each satellite (i.e., the exact timing of the PRN code transmitted by each satellite), (2) the Doppler shift associated with each satellite, (3) which satellites are above the horizon, and (4) the 50 bps modulated bit stream from each satellite. Auxiliary system 505 then transmits to wireless terminal 501, via a wireless telecommunications channel, for each satellite above the horizon: (1) an estimate of the PRN synchronization, (2) an estimate of the Doppler shift, and (3) the 50 bps modulated bit stream. Collectively, this information will be called "Navigation Message Data."

When auxiliary system 505 is part of a wireless telecommunications system that partitions a geographic area into a number of tessellated areas called "cells," auxiliary system 505 knows which cell wireless terminal 501 is in and, therefore, its rough location to within a few miles. When auxiliary system 505 has a rough idea (e.g., within a few miles) of the position of wireless terminal 501, auxiliary system 505 can accurately estimate the PRN synchronization and Doppler shift as seen by wireless terminal 501.

Figure 3:
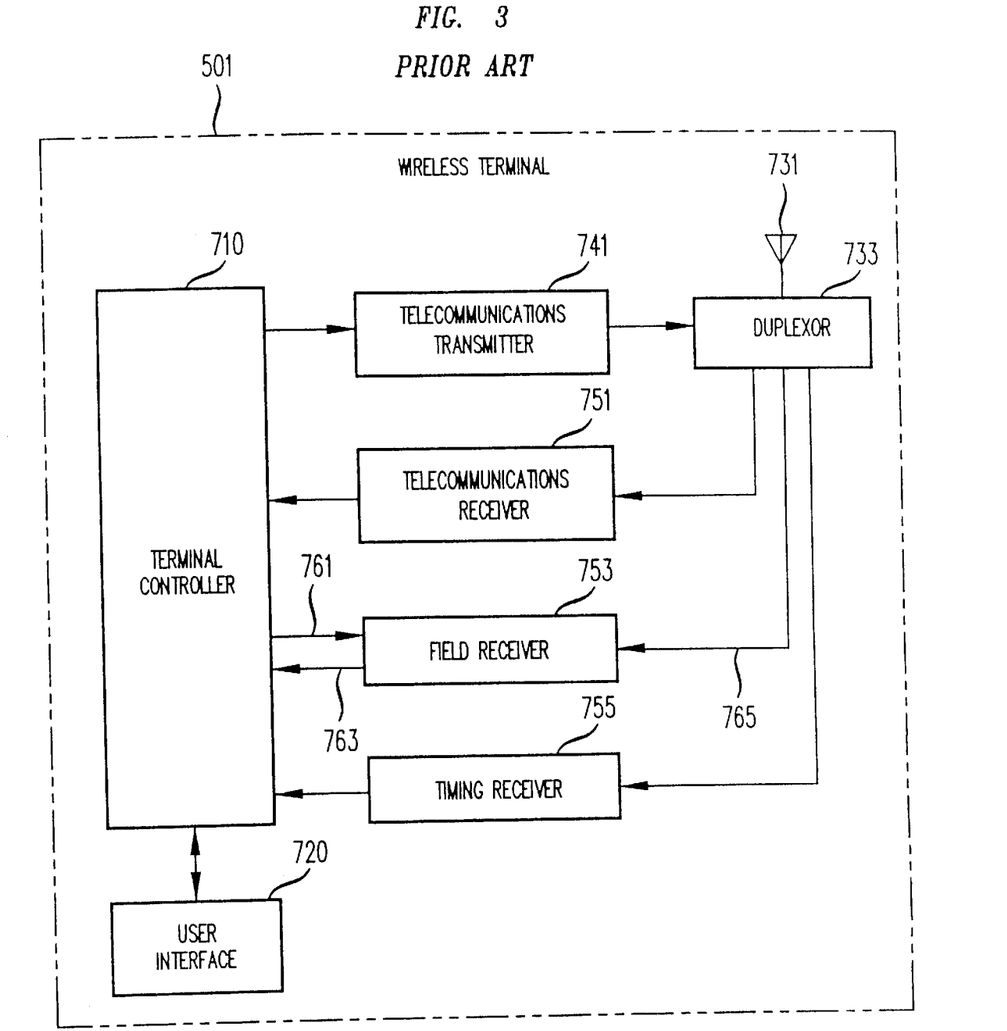
FIG. 3 depicts a block diagram of the wireless terminal shown in FIG. 1.

FIG. 3 depicts a block diagram of the major components of wireless terminal 501, which comprises: terminal controller 710, user interface 720, telecommunications transmitter 741, telecommunications receiver 751, field receiver 753, timing receiver 755, duplexor 733 and antenna 731, interconnected as shown.

Advantageously, but not necessarily, wireless terminal 501 is capable of performing all of the functionality associated with a typical wireless terminal (e.g., a cellular telephone,). In particular a user of wireless terminal is advantageously capable of having a two-way voice conversation through telecommunications transmitter 741, telecommunications receiver 751 and auxiliary system 505.

Because the Navigation Message Data is transmitted to wireless terminal 501 from auxiliary system 505, the Navigation Message Data is received by wireless terminal 501 via telecommunications receiver 751. Telecommunications receiver 751 passes the Navigation Message Data to terminal controller 710, which, in turn, passes the Navigation Message Data to field receiver 753.

As discussed above, wireless terminal 501 also advantageously receives system timing for synchronization purposes. When the timing signal is transmitted from timing source 507, the timing signal is received by wireless terminal 501 via timing receiver 755. Timing receiver 755 passes the timing signal to terminal controller 710 which, in turn, passes the timing signal to field receiver 753. Alternatively, when the timing signal is transmitted from auxiliary system 505, (as is the case when wireless terminal 501 and auxiliary system 505 are part of a CDMA telecommunications system) the timing signal is received by telecommunications receiver 741. Telecommunications receiver 741 then passes the timing signal to terminal controller 710 which, in turn, passes the timing signal to field receiver 753.

In either case, field receiver 753 receives the timing information that it needs without needing to derive it from satellite constellation 503. Furthermore, field receiver 753 also receives for each satellite above the horizon: (1) an estimate of the PRN synchronization, (2) an estimate of the Doppler shift, and (3) the 50 bps modulated bit stream, again without having received any of this information directly from satellite constellation 503.

Wireless terminal or WAG client 501 uses the received information about each satellite (in the Navigational Message Data) to acquire the GPS signals transmitted by these satellites. For example, WAG client searches for GPS signals at the Doppler shift estimate and at the PRN synchronization estimate or a progressive search of synchronization positions near the PRN synchronization estimate.

SUMMARY OF THE INVENTION

The present invention is directed towards a method for estimating a PRN synchronization and Doppler shift of a satellite signal at a reference location within a cell and sector of where a wireless terminal or WAG client is located. The estimates are based on information conveyed by a GPS signal acquired by an auxiliary system or WAG server, which may be at a location different from the wireless terminal or WAG client. The PRN synchronization and Doppler shift estimates are also based on some reference time, which is a time that is sufficiently far into the future to allow the WAG client to demodulate and decode the PRN synchronization and Doppler shift estimates from an assisting message transmitted by the WAG server and to use such estimates to acquire GPS signals, wherein the assisting message indicates the PRN synchronization and Doppler shift estimates.

In one embodiment, the assisting message can be broadcast to WAG clients. The assisting messages can be used by WAG clients to locate themselves; no additional help by the WAG server is required and no reverse-link communication is needed. This has the added advantage of privacy, as the system has no knowledge of which WAG client, if any, are locating themselves. In another embodiment, the assisting message is transmitted to WAG clients on demand. In this embodiment, the WAG client has established a communication link, wants to be located immediately and is aware that a location operation is going on. In this mode, the terminal requests assistance from the WAG server and, after an exchange of a few messages, its location is determined with help from the WAG server.

BRIEF DESCRIPTION OF THE DRAWINGS

FIG. 4 depicts an example of a reference location within a sector of a cell associated with a base station;

FIG. 4(*a*) is a flow diagram of an exemplary method in accordance with the invention;

FIG. 4(*b*) depicts an example of a reference location within a sector of a cell associated with a base station;

DETAILED DESCRIPTION

Figure 4A:
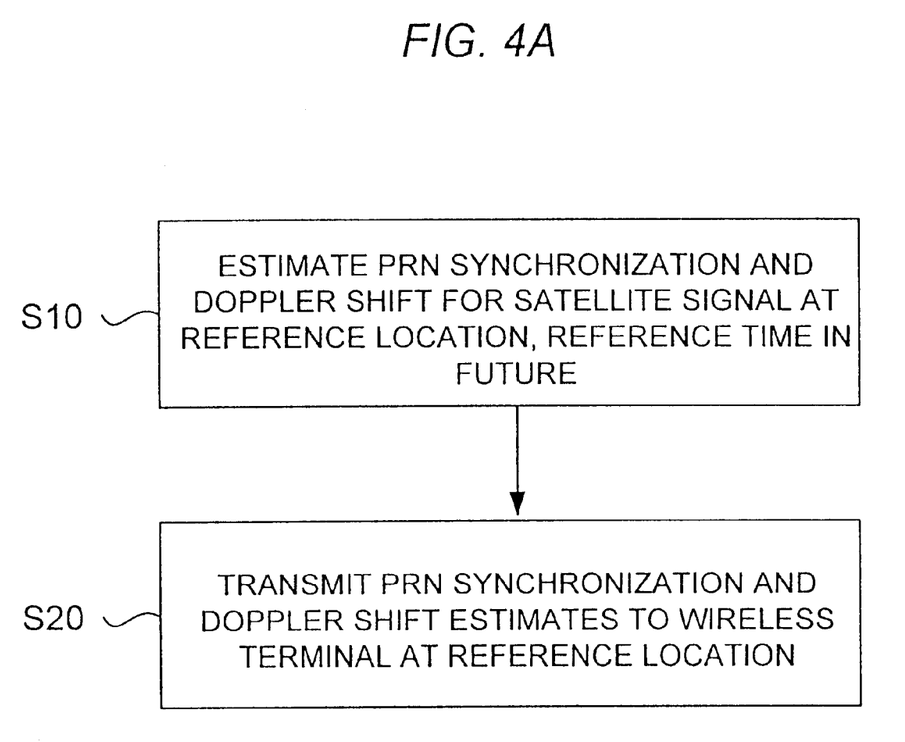

FIG. 4(*a*) is a flow diagram of an exemplary method in accordance with the invention. As seen in FIG. 4(*a*), there is a method of assisting the location of a satellite signal for a wireless terminal, in which a PRN synchronization and a Doppler shift is estimated for the satellite signal at a reference location (step S10). The PRN synchronization and Doppler shift of the satellite signal is estimated at a reference location within a cell and sector of where a wireless terminal or WAG client is located. The estimates are based on information conveyed by a GPS signal acquired by a auxiliary system or WAG server, which may be at a location different from the wireless terminal or WAG client. The PRN synchronization and Doppler shift estimates are also based on some reference time, which is a time that is sufficiently far into the future to allow the WAG client to demodulate and decode the PRN synchronization and Doppler shift estimates. The estimated PRN synchronization and Doppler shift estimates are then transmitted (step S20) in an assisting message by the WAG server to the WAG client for use in acquiring GPS signals. The assisting message indicates the PRN synchronization and Doppler shift estimates.

The WAG server of the present invention assumes that a WAG client is at a "reference location" within a cell and sector in which the WAG client is currently located. Based on satellite ephemeris and ranging information acquired by a WAG server, the WAG server estimates PRN synchronization and Doppler shifts for the WAG client at the reference location at some reference time. The PRN synchronization and Doppler shift estimates are transmitted as part of a message referred to herein as an "assisting message" to be used by the WAG client to facilitate acquisition and processing of GPS signals.

Figure 4B:
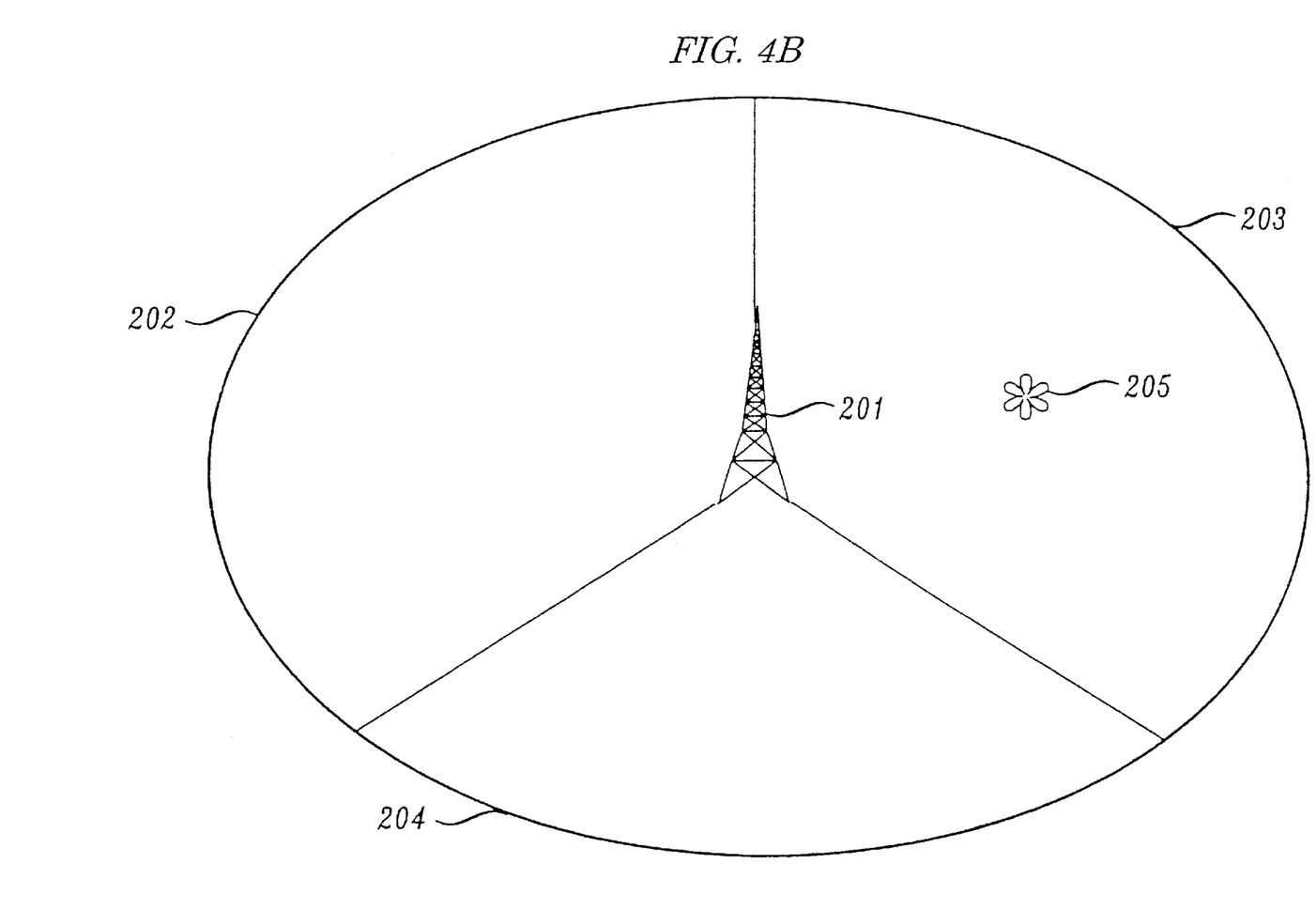

For each cell and sector, the WAG sever defines a reference location. The reference location is meant to be an approximate guess at the location of a WAG client or wireless terminal located in that cell and sector. For example, it might be the center of mass of the coverage area. It is supposed to be a three-dimensional location. Including elevation. See FIG. 4(b), which depicts a base station 201 and its associated cell that has been divided into a plurality of sectors 202, 203 and 204. Note that point 205 is a point located at the center mass of the coverage area or sector 203, and is an example of a possible reference location within sector 203.

The WAG server also defines a "reference time." The reference time should be sufficiently far into the future to allow the WAG clients to demodulate and decode the assisting message, and prepare their GPS receiver (of the WAG clients) to take advantage of a location opportunity. The reference time should be defined in terms of the wireless system's own time reference scale. For example, in an IS-95 system, it may be defined as the beginning of a particular 20-ms frame (frame n. xxx in the future). Together, we'll refer to the reference location and reference time as the "reference event." Since IS-95 timing is referred to GPS time to within a few microseconds, the event is also accurately defined on the GPS time scale.

Next, the WAG server computes the parameters of the signal from each GPS satellite, as they will be at the reference event. It can do so because it has a high-quality GPS receiver, with full view of the sky, which has been operating for a long time; hence, it knows the ephemeris of all the satellites. Since the reference event is in the future, there is a small amount of uncertainty as to the future status of certain parameters (most notably, Selected Availability); however, as long as the calculation is done only a few seconds in advance (e.g. 10–15 seconds) the error is negligible. The assisting message conveys to the WAG client the values of these parameters for a number of visible satellites.

The parameters are:
1) Satellite position in the sky (e.g., elevation and azimuth) and its time derivative.
2) Satellite Doppler shift.
3) The "time of arrival" of the satellite signal, which consists of:
   a) the fractional-chip phase of the C/A code generator
   b) the whole-chip state of the C/A code generator
   c) the 1-ms epoch, defining which repetition of the code is being received
   d) the 20-ms epoch, defining which modulation bit is being received The WAG client will, of course, not be at exactly the reference location; therefore, the time of arrival of the satellite signal observed by the WAG client will be slightly different. The WAG server must also calculate the maximum range of this discrepancy as a function of the size and shape of the coverage area (e.g., the size of the particular sector). The calculation will take into account the position of the satellite in the sky, and the propagation delay from the base station to the wireless terminal or WAG client. The latter may increase or reduce the timing-uncertainty range depending on the relative positions of the satellite, the base station and the sector. The calculation should also include any additional sources of timing uncertainty known to be present (e.g., the 1–3 $\mu$s timing difference allowed between IS-95 and GPS time). The result is an upper and lower bound for the range of values of the time of arrival. This information will be used by the WAG client to define the search interval over which to look for the GPS signal.

Finally, the WAG client needs to know what information bits were transmitted by each satellite around the reference time. To allow for very long integration times, we would like to convey several seconds' worth of data. Since each satellite transmits at a rate of 50 bps, this portion of the assisting message may well be the largest one. For example, if 10 satellites are visible, and if we want to convey twelve seconds' worth of data, we need to convey as many as 6000 bits. However, we can reduce this amount by observing that, frequently, different GPS satellites transmit the same data. Accordingly, the assisting message includes records of transmitted navigation data bits that can be shared among satellites.

Instances of different satellites transmitting the same bits include the telemetry word and the handover word, which occur at the beginning of every subframe (every 6 seconds). Furthermore, the entire fourth and fifth subframes of the GPS transmission frame are nominally the same for all satellites. (The two subframes span a total of 12 seconds and occur once every 30 seconds). Therefore, if the WAG server chooses the reference time to occur at the midpoint between the two subframes, it is possible to offer, once every 30 seconds, a location opportunity that covers a very long integration time (12 seconds) with a relatively small assisting message (less than 2000 bits).

The observant reader will notice that, since the reference time is in the future, the WAG server will have to predict the navigation data bits conveyed as part of the assisting message. This is not a big problem because they are repeated periodically and they change only infrequently. Occasionally, there will be times when the predictions are incorrect. At those times, any WAG client that takes advantage of that location opportunity may suffer a loss of SNR due to the bit errors in the prediction. The damage can be minimized by observing that certain portions of the subframes (e.g., the telemetry word and the HOW) can be predicted with much better reliability than others. By using preferentially those portions of the satellite transmissions, the impact of prediction errors will be minimal. Furthermore, if this location technique becomes widespread, it may be possible to ask the agency maintaining the GPS system to make the contents of future satellite uploads publicly available (e.g. on the web) with a small advance margin (e.g., five minutes). This way, the WAG server wouldn't have to predict future transmitted bits from the received GPS signal.

The assisting message can be used in conjunction with a variety of location modes. The present invention identifies two different location "modes" which cover two fundamentally different sets of requirements and, in combination, offer enough flexibility to accommodate most WAG applications. They are "broadcast" and "location on demand." The first location mode, i.e., broadcast, provides location "opportunities" at regular intervals (e.g. once a minute) to all terminals in the coverage area which choose to take advantage of them. Its main purpose is to allow location of idle-mode terminals. In this mode, base stations transmit assisting messages (received from WAG server) at regular intervals on a broadcast channel. These messages can be used by appropriately-equipped wireless terminals to locate themselves; no additional help by the WAG server is required and no reverse-link communication is needed. This has the added advantage of privacy, as the system has no knowledge of which terminals, if any, are locating themselves. The second location mode, i.e., location on demand, addresses the needs of, for example, a user who turns on the phone to make an emergency call. In this case, the user has established a communication link, wants to be located immediately and is aware that a location operation is going on. In this mode, the terminal requests assistance from the WAG server and, after an exchange of a few messages, its location is determined with help from the WAG server.

The main purposes of the Broadcast mode are to allow continuous location of idle terminals without requiring that these terminals exchange information with the WAG server, to allow leverage of location history so that, for example, badly faded locations such as those deep within a building may still have acceptable location results, and to create maximally efficient use of assisted GPS capabilities by transmitting relatively few bits that can be used in common by all enabled, authorized terminals The broadcast mode is a "one-way" implementation of WAG, where the terminal may have to do a little more work than the "Location On Demand" mode to fully determine its own location, but with the advantage that no reverse-link communication is needed. In this mode, the base station sends location-assisting messages at regular intervals over a broadcast channel. These messages are available to all terminals in the coverage area that want to use them, and contain all the information needed to complete a location operation. We call these messages "location opportunities" and, if they occur frequently enough (for example, once or twice per minute) they can provide virtually continuous location coverage for all terminals in the coverage area. Indeed, even active terminals may take advantage of this mode to determine their location without the overhead associated with the location-on-demand mode. This is especially advantageous if privacy is desired; in this mode, the system has no knowledge of which terminals are locating themselves and, of course, has no knowledge of their location. As we shall see, this capability can be provided at a very modest average capacity load on the broadcast channel of less than 100 bps, corresponding to a 2- to 3-kbit message once every 30 s.

The Location On Demand mode supports scenarios requiring immediate location of terminals and to locate active terminals without relying on information that these terminals developed via Broadcast Mode; in other words, applications requiring immediacy, and the possibly greater accuracy that implies. Location on demand is a "two-way" implementation of WAG, where an individual terminal is directed to measure GPS signals and respond with its results right away. In this mode, the base station typically sends assisting messages to the terminal to be located using the traffic channel that it is on (although the possible use of a broadcast channel or of packet-mode should not be excluded a priori). The message going from the Network to the mobile is an assisting message referred to herein as a "Location Estimation Status Message." The message sent to that terminal has been tailored to the expected needs of that particular terminal, and most of the time will contain all the information needed to complete a location operation. Should the information prove insufficient, another Location Estimation Status Message may follow to request additional processing/data from the mobile.

Figure 5:
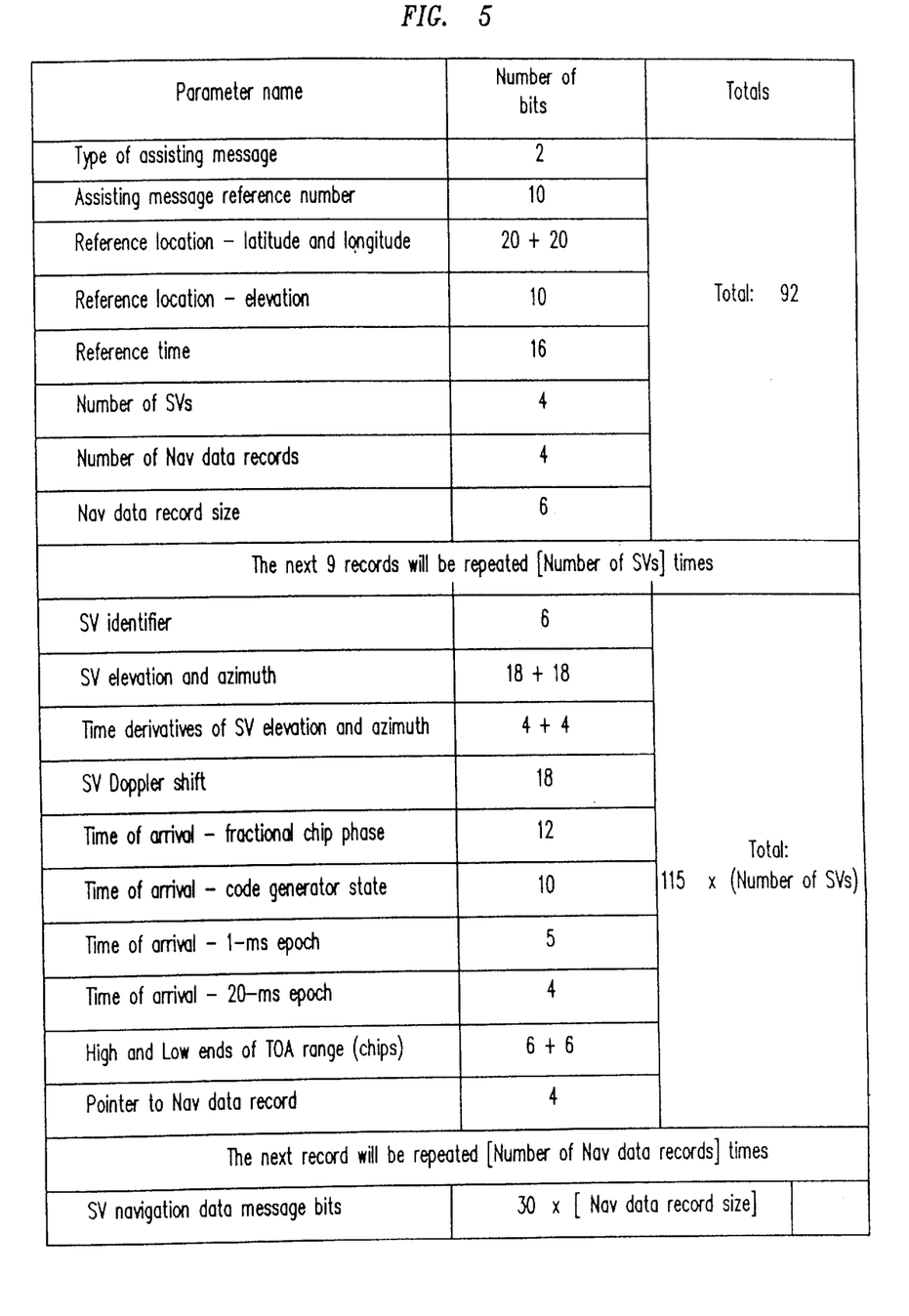
FIG. 5 depicts a list of all the fields included in AN assisting message with their size in bits in accordance with one embodiment of the present invention.

FIG. 5 shows a list of all the fields included in the assisting message with their size in bits in accordance with one embodiment of the present invention. The same message structure is used for both on-demand and broadcast modes; broadcast mode to accumulate the received parameters and/or use them in a rolling window, while on-demand mode supplies all needed data immediately. Note that the assisting message includes the sequence of bits that modulate the GPS signal, so that the WAG receiver can remove them. The philosophy behind the design of the assisted message is as follows.

The number of bits required to represent the various quantities depends on the resolution with which they need to be conveyed. That, in turn, depends on what each quantity is used for. FIG. 5 shows the required bit sizes; here we discuss how those values were obtained. The potential accuracy of a WAG receiver is the same as that of a Differential GPS (DGPS) receiver, since the algorithm is equivalent. Frequently, DGPS receivers can achieve sub-meter accuracy and, therefore, we will require that the resolution with which parameters are conveyed be consistent with sub-meter location accuracy.

Note that no allowance is made for parity bits for error control. This is consistent with the IMT-2000 requirement of a $10^{-6}$ bit-error rate (BER) for data communications, which is adequate to convey the assisting message. In case this BER is not available, we observe that the portion of the message containing the navigation data bits is used only for modulation wipeoff and, therefore, can tolerate a BER as high as $10^{-2}$ with only minimal impact on SNR. The rest of the assisting message, however, requires a BER better than $10^{-4}$ or so to insure that the contribution to location failures due to bit errors will be negligible.

The following is a description of each field and the corresponding bit requirements. Reference location. This is an arbitrarily chosen point that is supposed to be in the general area where the mobile is; the center of a cell/sector is a natural choice for this location. No great resolution is needed to represent it. Accordingly, we assume 20 bits each for latitude and longitude and 10 bits for elevation, corresponding to a resolution better than 40 m. This is much more than necessary, but this parameter has minimal impact on the overall message size so we go for overkill.

Reference time. Same as the previous item, no great resolution is needed. As in the example in the previous subsection, it can be the beginning of a specified 20-ms frame in the future. We allow 16 bits to specify which frame.

Again, we go for overkill.

Number of SVs. How many satellites are visible? 4 bits will allow up to 16.

SV identifier. We allow 6 bits to specify a particular satellite or pseudolite.

SV elevation and azimuth. These angles will be used to compute the actual location of the wireless terminal or WAG client as a differential value from the reference location. Since the wireless terminal or WAG client can be several thousand meters away from the reference location, we need a resolution better than 0.1 mradian, if sub-meter accuracy is to be achieved. Accordingly, we assume 18 bits for each quantity.

Time derivatives of SV elevation and azimuth. In the 12 seconds duration of a location opportunity, an SV can move by as much as 1 mradian (½ mradian on either side of the reference time). For the 18-bit resolution of the previous item to be meaningful, we need 4 bits for each of the derivatives. These will be used to get the correct angles at all times within the location opportunity.

SV Doppler shift. There are three purposes for this parameter: 1) To correct the received carrier frequency and bring it within the receiver bandwidth; 2) to correct the code generator clock frequency for proper integration; and 3) to predict code phase differences at all times within the location opportunity. The last one is the more stringent requirement because, to achieve sub-meter accuracy, code-phase differences must be predicted with sub-ns accuracy. To do that 6 seconds away from the reference time, the clock frequency must be known to better than 0.1 MHz, corresponding to a carrier Doppler shift of 0.15 Hz. Since the range for the carrier Doppler shift is about ±4 kHz, we allow 18 bits for this parameter.

Time of arrival of SV signal. As before, this parameter is used for computing the location. To achieve sub-meter accuracy, we need sub-ns resolution; accordingly, we assign 12 bits to the fractionalchip phase. Code period is 1023 chips, so we need 10 bits for the state of the code generator. There are 20 1-ms epochs per bit, so we need 5 bits for that. For the last item, the 20-ms epoch, we have to ask what kind of uncertainty we are trying to resolve. All the parameter values are relative to the reference event. Nominally, that will be the midpoint between the fourth and fifth subframe. However, because of the variable distance between the satellite and the surface of the earth, the granularity of the reference time specification and other sources of offset, that position may be off by as much as a few tens of milliseconds. That is the range that must be covered by the 20-ms epoch specification. In the spirit of being generous, we assign 4 bits to it. It will cover a range of ±160 ms, which is more than enough.

Pointer to Nav data record. Indicates how many Nav data records will follow

SV navigation data message bits. Gives the bits received from a given SV to enable longer integration times at the mobile: The Nav data record size is the number of GPS data words made available for use in this integration cycle. Note GPS data words have length of 30 bits each.

Figure 6:
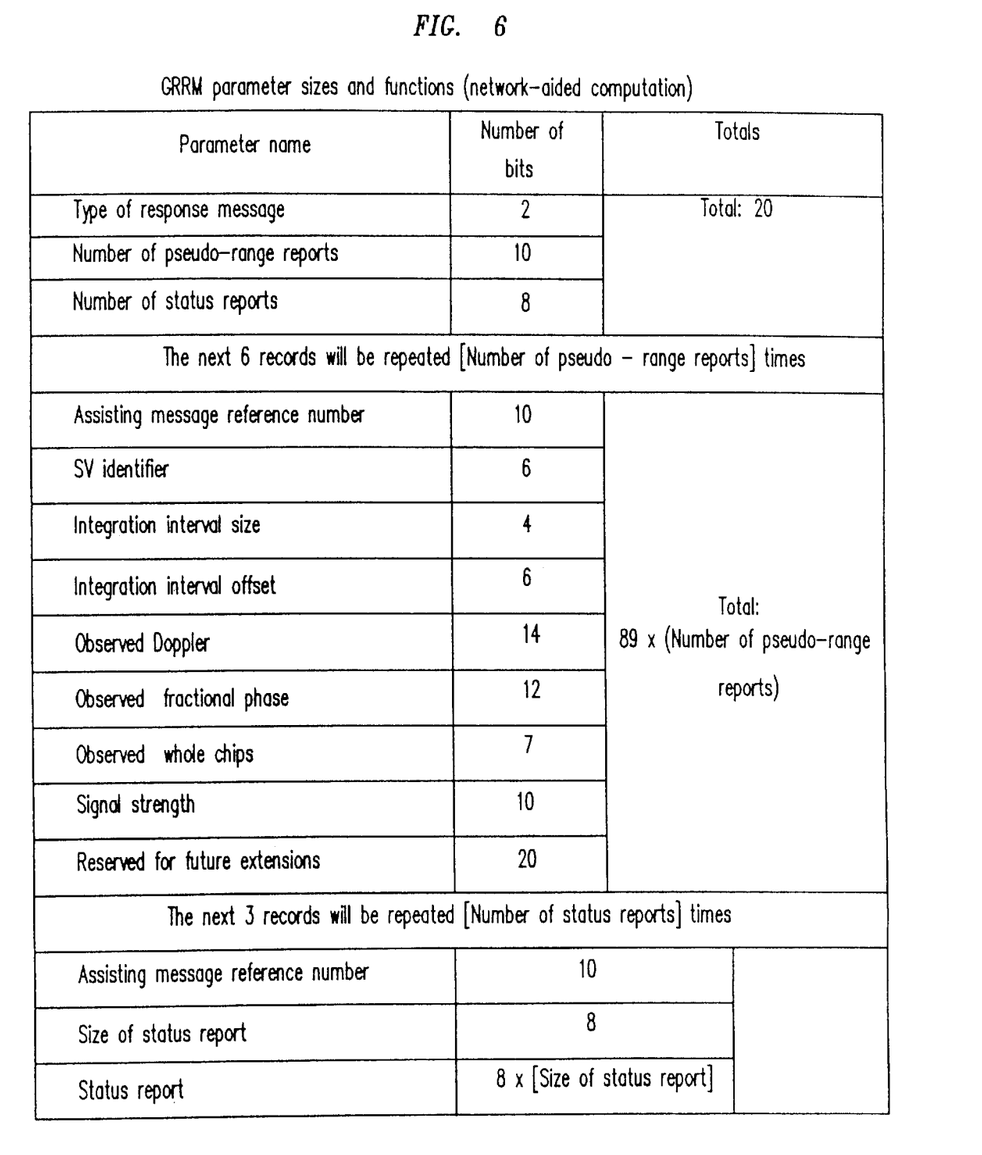
FIGS. 6 and 7 depict lists of all fields (parameter sizes and functions) included in possible response messages.
Figure 7:
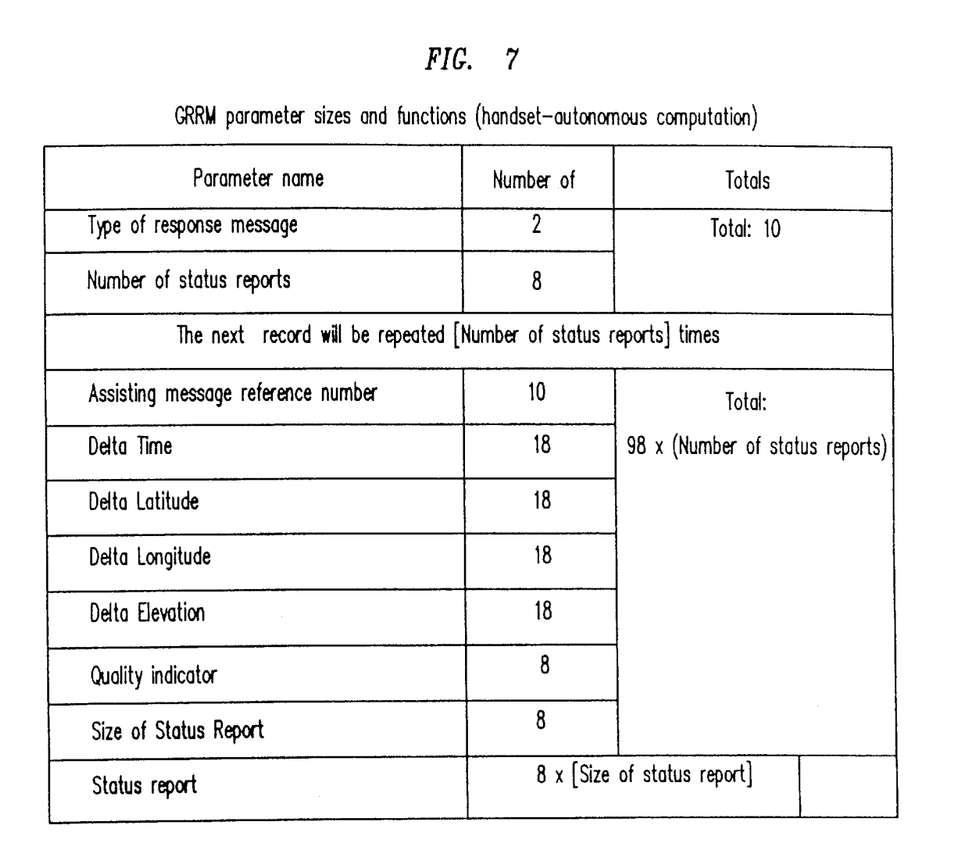

FIGS. 6 and 7 depict lists 600 and 700 of all fields (parameter sizes and functions) included in response messages. FIG. 6 depicts a message used for network-aided computations. In a message of this type, the wireless terminal or WAG client conveys information about its present location by reporting 4–10 pseudo ranges from all visible satellites with no status report. The size of such a message is 340–800 bits. If this message type is used to convey several different locations measured at different times, the size will be 300–700 bits multiplied by the number of locations reported. If status reports are included, their size should be added to the total. The absolute size limit imposed by the size of the indices is 605627 bits; this is, obviously, large enough to accommodate all cases of practical interest.

FIG. 7 depicts a message used for handset-autonomous computations. In a message or this type, the wireless terminal or WAG client conveys information about its present location by reporting its coordinates (time and space) with no status report. The coordinates are expressed as offsets from the reference event of the associated assisting message. The size of such a message is 108 bits. If this message type is used to convey several different locations measured at different times, the size will be 108 bits multiplied by the number of locations reported. If status reports are included, their size should be added to the total. The absolute size limit imposed by the size of the indices is 545200 bits; this is, obviously, large enough to accommodate all cases of practical interest.

We claim:

1. A method of assisting location comprising the steps of:

estimating a PRN synchronization and a Doppler shift for a satellite signal at a reference location and a reference time in the future for a wireless terminal, the reference time being a time in the future that is greater than a time required for demodulation and decoding of the PRN synchronization and Doppler shift estimates by the wireless terminal; and transmitting the PRN synchronization and Doppler shift estimates to the wireless terminal.

2. The method of claim 1, wherein the PRN synchronization and Doppler shift are based on the reference time.

3. The method of claim 1, wherein the reference location is an approximate guess of a position of the wireless terminal.

4. The method of claim 1, wherein the reference location is at a center mass of the area in which the wireless terminal is located.

5. The method of claim 1, wherein the PRN synchronization and Doppler shift estimates are based on information conveyed by a satellite signal received at a location different from the reference location.

6. The method of claim 1, wherein the PRN synchronization and Doppler shift estimates are transmitted at regular intervals.

7. The method of claim 1, wherein the PRN synchronization and Doppler shift estimates are transmitted on a broadcast channel.

8. The method of claim 1, wherein the PRN synchronization and Doppler shift estimates are transmitted upon receiving an indication to locate the wireless terminal.

9. A method of assisting location comprising the steps of:

estimating a PRN synchronization and Doppler shift for a reference event in the future; and transmitting the PRN synchronization and Doppler shift estimates at regular intervals to a client based on the reference event, the reference event including a reference time in the future that is greater than a time required for demodulation and decoding of the transmitted PRN synchronization and Doppler shift estimates by the client.

10. The method of claim 9, wherein the PRN synchronization and Doppler shift estimates are transmitted on a broadcast channel.

11. The method of claim 9, wherein the PRN synchronization and Doppler shift estimates are based on information conveyed by a satellite signal.

12. The method of claim 9, wherein the PRN synchronization and Doppler shift estimates are based on information conveyed by a satellite signal and an area in which a wireless terminal is located.

13. The method of claim 9, the reference event including a reference location for the client to receive said transmitted PRN synchronization and Doppler shift estimates, the reference location being within a cell or sector of where the client is located.

* * * * *